United States Patent [19]
Kitano et al.

[11] Patent Number: 5,347,846
[45] Date of Patent: Sep. 20, 1994

[54] KNOCKING DETECTING DEVICE FOR INTERNAL COMBUSTION ENGINE AND METHOD THEREFOR

[75] Inventors: Kouji Kitano, Kagawa; Mitsuo Kayano, Hitachi, both of Japan; Masayoshi Kaneyasu, Farmington Hills, Mich.; Kouzou Katougi, Hitachi, Japan; Takanobu Ichihara, Katsuta, Japan; Nobuo Kurihara, Hitachioota, Japan

[73] Assignee: Hitachi, Ltd., Tokyo, Japan

[21] Appl. No.: 847,691

[22] Filed: Mar. 6, 1992

[30] Foreign Application Priority Data

Mar. 7, 1991 [JP] Japan .................................. 3-65262

[51] Int. Cl.$^5$ .............................................. G01L 23/22
[52] U.S. Cl. .............................................................. 73/35
[58] Field of Search ....................... 73/35; 364/431.08; 123/425, 435

[56] References Cited

U.S. PATENT DOCUMENTS

| | | | |
|---|---|---|---|
| 4,694,800 | 9/1987 | Morita | 123/425 |
| 4,991,553 | 2/1991 | Kurihara | 364/431.08 |
| 5,092,160 | 3/1992 | Veda | 73/35 |

FOREIGN PATENT DOCUMENTS

0392804A2 10/1990 European Pat. Off. .
3523017C2  3/1988 Fed. Rep. of Germany .
3911554A1 11/1990 Fed. Rep. of Germany .
3917907A1 12/1990 Fed. Rep. of Germany .

*Primary Examiner*—Hezron E. Williams
*Assistant Examiner*—Christine K. Oda
*Attorney, Agent, or Firm*—Antonelli, Terry, Stout & Kraus

[57] ABSTRACT

Knocking detecting in an internal combustion engine uses, a vibration sensor detecting engine vibrations; and insert for taking-in output vibration signals from the vibration sensor in a plurality of intervals in a time sequential manner during every explosion stroke of the internal combustion engine; performing a digital frequency analysis on the taken-in output vibration signals in the respective sequential intervals; setting a main resonance frequency necessary for knocking occurrence judgement based upon the instant operating condition of the internal combustion engine; calculating knocking indexes for the digital frequency-analyzed output vibration signals in the respective sequential intervals based upon the set main resonance frequency component; comparing the largest knocking index calculated with a predetermined threshold value determined by a background vibration level and a slice level thereof to determine occurrence of knocking; and renewing the respective background vibration levels using the calculated knocking indexes when no knocking occurrence is determined. With such an operation a knocking detection with a high S/N ratio and a high sensitivity is achieved.

5 Claims, 8 Drawing Sheets

VIBRATION SENSOR OUTPUT

FIG. 8(b)

VIBRATION INTENSITY ANALYSIS SECTIONS

FIG. 8(c)

VIBRATION INTENSITY

FIG. 8(d)

KNOCKING JUDGEMENT SECTION

FIG. 8(e)

S/N IN KNOCKING JUDGEMENT SECTION

———— PRESENT METHOD
– – – – CONVENTIONAL METHOD

↑ TDC ——→ CRANK ANGLE

KNOCKING DETECTING DEVICE FOR INTERNAL COMBUSTION ENGINE AND METHOD THEREFOR

BACKGROUND OF THE INVENTION

The present invention relates to a knocking detecting device for an internal combustion engine and a method therefor, and in particular, relates to a knocking detecting device suitable for a gasoline engine used for an automotive vehicle and a method therefore.

When knocking is generated in an engine, a vibration having characteristic resonance frequency components is generated. Therefore, a the occurrence of knocking is judged by detecting this vibration.

In actual detection of the presence and absence of knocking, it is necessary to separate the vibration induced by knocking from background vibrations having no relation to knocking among engine vibrations detected by a vibration sensor.

Therefore, in conventional knocking detecting devices, such as disclosed in JP-A-58-45520(1983), predetermined resonance frequency components in the range of 5~12 $KH_z$ are separated produced by the output signal from a vibration sensor using a band pass filter and the presence and absence of knocking is judged by a determination of whether or not an integrated value of the output form the band pass filter exceeds a predetermined level.

Further, in the above exemplified knocking detecting device, the integration of the resonance frequency components was performed by an analog circuit to detect presence and absence of the knocking.

In the above exemplified conventional knocking detecting devices, influences caused by vibrations other than knocking vibration contained in the output signal from the vibration sensor, such as seating vibration by valves and sliding vibration by pistons, are not sufficiently taken into account. As a result, the conventional knocking detection devices are susceptible to noises during a high speed engine rotation so that there was a problem in the operation of such devices with regard to an accurate knocking detection because of a poor detection sensitivity.

Further, in the conventional knocking detection devices, methods of providing an accurate processing of the output signals from the vibration sensor, such as with Fast Fourier Transform, were not taken into account for judging generation of knocking and therefore, sufficient use could not be made of valuable information contained in the output signal from the vibration sensor with the result that there was a problem that an accurate judgement of the presence and absence of knocking could not be achieved.

Still further, the conventional knocking detecting devices have not taken into account the fact that the vibration caused by knocking is not necessarily distributed over the entire period of one explosion stroke; and so vibration signals over a substantial period of one explosion stroke, which includes vibrations when no knocking has occurred were used for knocking judgement. As a result during a heavy load and high speed operation of an internal combustion engine in which the level of noise vibration increases, there was a problem that detection of knocking vibration was difficult, thereby rendering the judgement of knocking impossible. Thus, it has been difficult to accurately detect knocking at an engine rotation speed more than 3000 rpm and in an engine power zone.

SUMMARY OF THE INVENTION

An object of the present invention is to provide a knocking detecting device for an internal combustion engine and a method therefor in which an accurate knocking detection and judgement is enabled over the entire driving condition of an internal combustion engine, even in a heavy load and high speed engine condition.

For achieving the above object, a first aspect of the present invention provides a frequency analysis and processing means which takes in output signals from a vibration sensor during a plurality of time periods a in a sequential manner during one explosion stroke of the engine and processes the same with a digital frequency analysis, and which uses a main resonance frequency setting means which sets a main resonance frequency necessary for the knocking judgement dependent upon the engine operating conditions.

Further, for achieving the above object, a second aspect of the present invention further provides means for determining initially a divided time period section having the largest vibration intensity signal during one explosion stroke and means for frequency analyzing the vibration signals within an analysis range in which the vibration signals of largest intensity are positioned at the center thereof.

The frequency analysis and processing means and the main resonance frequency setting means according to the first aspect of the present invention take out the vibration sensor output signals in a sequential manner in every explosion stroke, convert the same into digital signals and frequency-analyze the respective digital signals and, to thereby make it possible to take-out only the data exhibiting remarkably a characteristic vibration of knocking. As a result, the presence and absence of knocking is accurately judged even during a heavy load and a high rotation speed engine operating condition in which the background vibration level increases.

Further, the means for determining a divided time period section having the largest vibration intensity signal during one explosion stroke and the means for frequency-analyzing the vibration intensity signals in an analysis range in which the vibration signals of largest intensity are located in the center thereof according to the second aspect of the present invention search for the data portion having the largest vibration intensity among the output signals from the vibration sensor and the frequency analysis is concentrated on that data portion to judge knocking. As a result, even a weak knocking signal can be detected and the presence and absence of knocking can be judged over the entire range of the engine operating conditions.

The knocking is an engine is not a static phenomenon and so it is not possible to predict when knocking occurs in one explosion stroke or how long it continues, and the time and duration of knocking varies even under identical engine operating conditions. According to the second aspect of the present invention, the interval of one explosion stroke is divided into a plurality of continuous sections or periods and the vibration signals in the respective divided sections are locally investigated and thereafter the knocking analysis is concentrated on the data possibly containing knocking vibration signals, with a result that the detection sensitivity is enhanced.

The resonance frequencies for judging knocking occurrence vary depending upon various engine operating conditions, such as engine rotation number, however, according to the first aspect of the present invention, the frequency analysis is performed in a frequency range in which frequency components characteristic to knocking remarkably appear, and so the presence and absence of knocking generation is accurately judged even in a heavy load and a high speed engine operating condition in which the background vibration level increases. Further, when the vibration signal containing frequency components characteristic to knocking is divided into a plurality of sections or periods, the frequency components characteristic to knocking can be surely detected by analyzing the output signals from the vibration sensor while overlapping to the same extent the divided sections with each other.

Further, according to the second aspect of the present invention, the data portion having the highest possibility of containing vibration signals relating to knocking are at first searched for and determined, and the knocking judgement is performed based upon the determined data, and so a knocking judgement with a high sensitivity is achieved.

Still further, according to the present invention since the presence and absence of knocking generation is accurately judged even in a heavy load and a high speed engine operating condition, the engine output performance and fuel consumption of an internal combustion engine are improved.

Moreover, since according to the present invention, the information contained in the output signals from the vibration sensor is effectively utilized, the engine output performance and the fuel consumption of the internal combustion engine is optimumly controlled.

EXPLANATION OF EMBODIMENTS

Initially, the judgement principle of the presence and absence of knocking generation in the knocking detecting device according to the present invention will be explained.

As is well known, a multiplicity of vibration components are contained in an engine vibration, such as components due to friction by the pistons, rotation of the crank shaft and actuation of the valves. Further, these vibration components vary depending upon combustion conditions in the engine. When a knocking is generated in the engine, vibration characteristic to knocking is added in the vibration caused by combustion, in that caused by internal pressure variation in the engine cylinders. The judgement of the presence and absence of knocking is carried out by separating the vibration characteristic to knocking from the overall engine vibrations detected by a vibration sensor.

Figure 1:
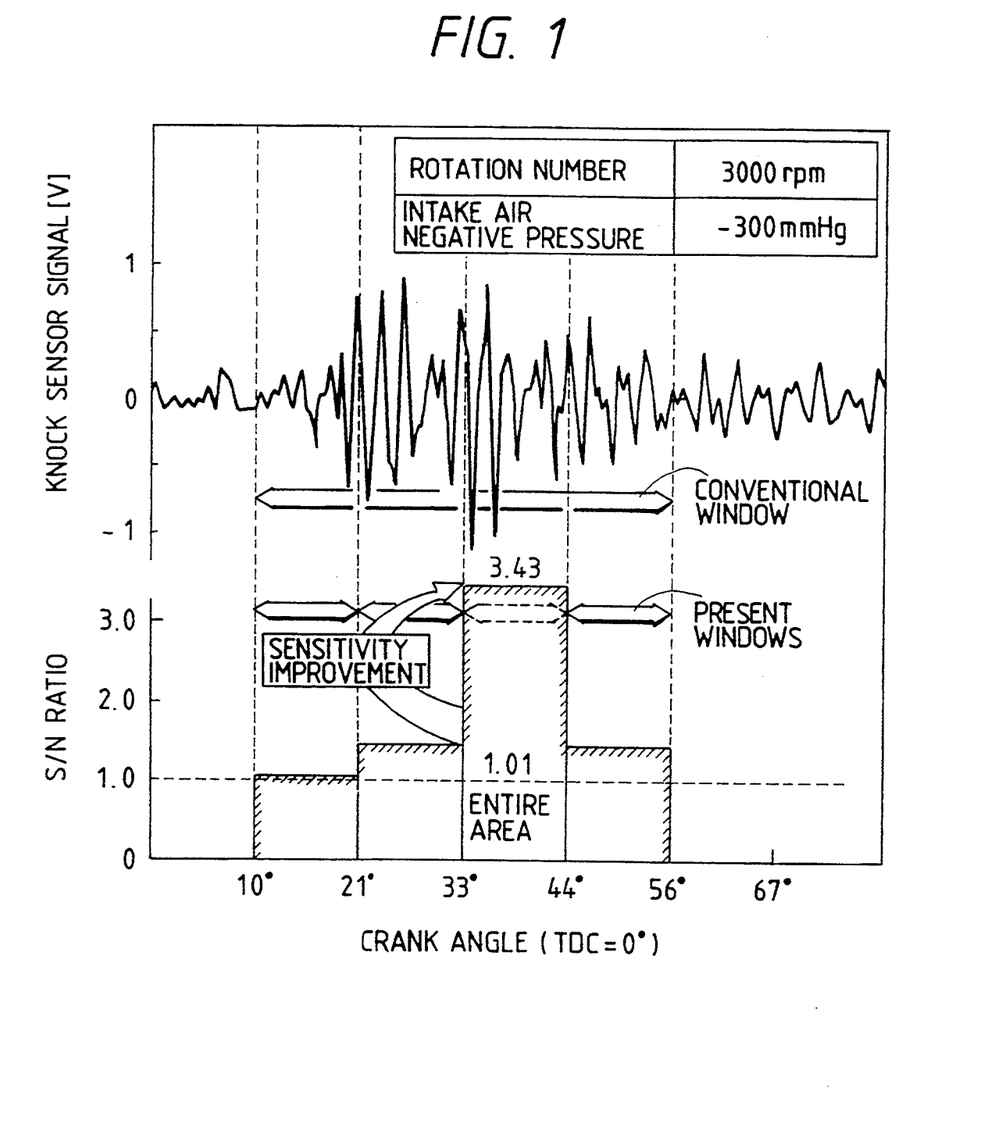
FIG. 1 is a view for explaining the operating principle of one embodiment of a knock detecting device for an internal combustion engine according to the present invention shown in comparison with a conventional method.
Figure 2:
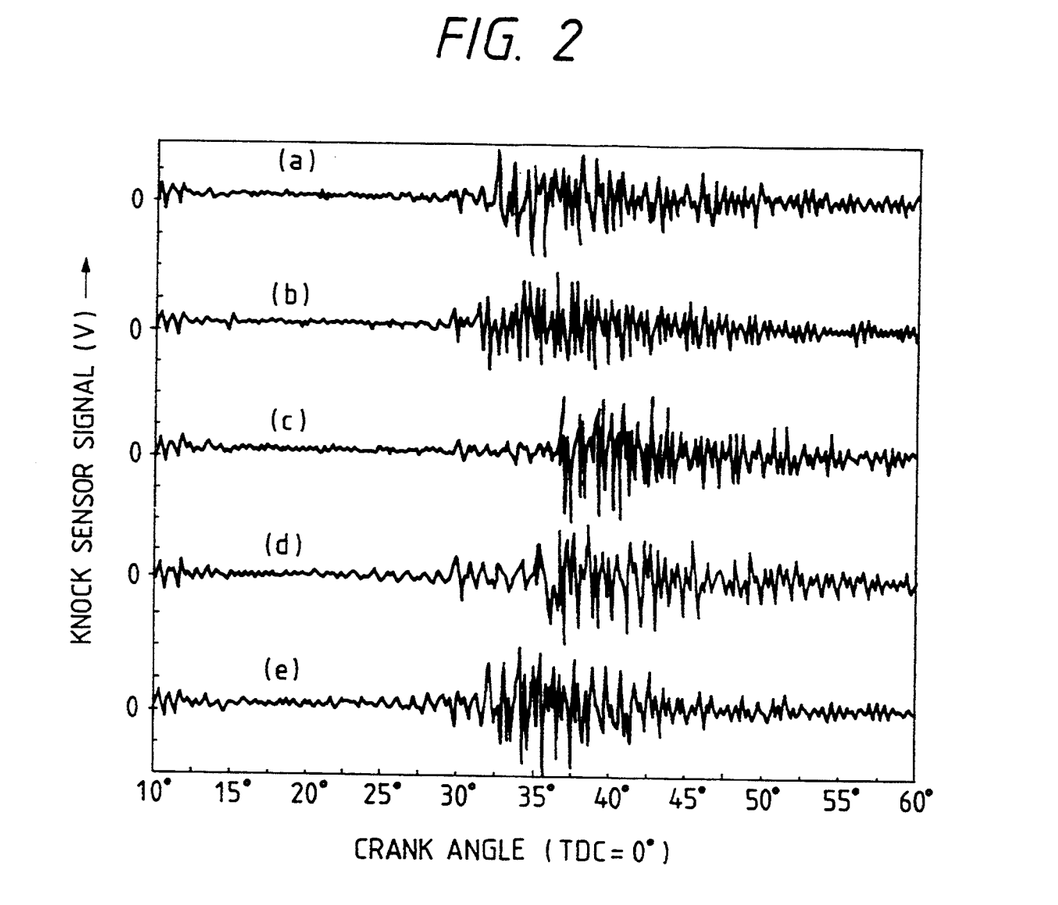
FIGS. 2(a) to 2(e) show a variety of knocking sensor signal waveform diagrams used in the explanation in connection with FIG. 1.

In the embodiments of the present invention, the output signals from the vibration sensor analyzed by making use of such frequency analysis methods as Fast Fourier Transform and Walsh to Fourier Transform, and the vibration signals from the vibration sensor during one explosion stroke are sequentially divided into a plurality of data which are represented by crank angle ranges, the respective data are frequency-analyzed to obtain frequency components characteristic to knocking with one of the above frequency analysis methods and the resultant frequency analysis in a form of S/N ratio in the crank angle ranges of $10°\sim21°$, $21°\sim33°$, $33°\sim44°$, and $44°\sim56°$ vary section by section as shown in FIG. 1.

On the other hand, in the conventional knocking detecting device as illustrated in FIG. 1, the vibration signals from the vibration sensor contained in a predetermined crank angle range of $10°\sim56°$ during every single explosion stroke were taken-out and a predetermined frequency component in the taken-out signals which is induced when knocking is generated was integrated over the predetermined crank angle range to judge the occurrence of knocking. However because a substantial period of the crank angle contains no knocking related frequency, an insufficient S/N ratio was obtained which reduced the knocking detection sensitivity.

However, according to the present invention, as also illustrated in FIG. 1, when the output signals during one explosion stroke from the vibration sensor is sequentially divided into a plurality of sections and only the data in a specific divided section exhibiting an intense vibration characteristic to knocking is used to judge a knocking, the knocking detection sensitivity is improved.

FIGS. 2(a) to 2(e) represent variations of crank angle positions where vibration caused by combustion, occur under the same ignition timing, but in different engine operating conditions. As will be understood from FIGS. 2(a) to 2(e), in the invariable constant crank angle period for integrating the knocking related frequency component of the conventional wide single window method, vibration signals in a period where the knocking related vibrations can not exist were also included in the wide single window with the result that the S/N ratio for knocking judgement was reduced.

Hereinbelow the knocking detecting device according to the present invention is explained in detail with reference to the embodiments shown in the drawings.

Figure 3:
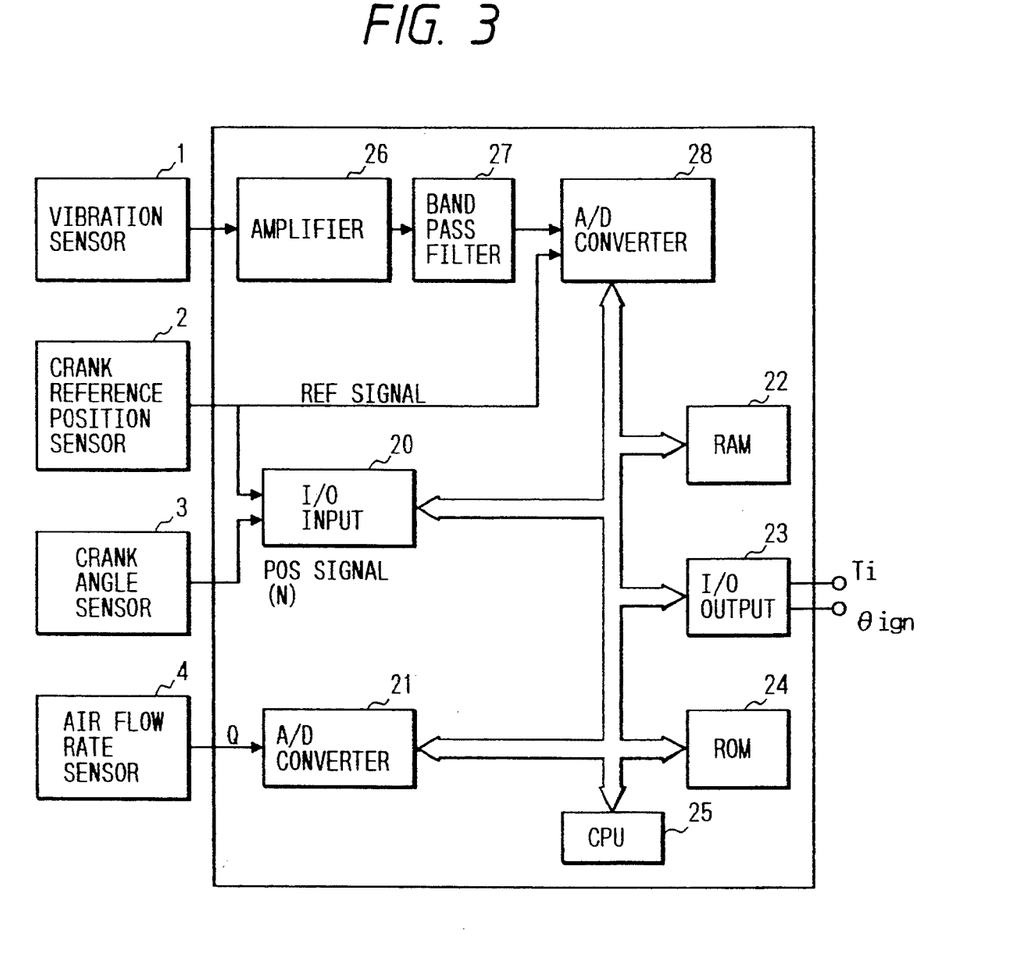
FIG. 3 is a block diagram showing one example of an engine control system for an internal combustion engine including one embodiment of a knocking detecting device according to the present invention.

FIG. 3 shows one example of an engine control system for an internal combustion engine including an embodiment of a knocking detecting device according to the present invention. The engine control system is constituted by a control block composed of an input unit 20 of an I/O unit, an A/D converter 21, a RAM 22, an output unit 23 of an I/O unit, a ROM 24 and a CPU 25, and an engine vibration take-in block composed of an amplifier 26, a band pass filter 27 and an A/D converter 28. The engine control system takes-in signals from a vibration sensor 1 mounted on the engine, a crank reference position sensor 2, a crank angle sensor 3 and an air flow rate sensor 4, calculates a fuel injection signal Ti and an ignition timing signal $\theta$ ign based upon the input signals and outputs the calculated signals.

An intake air amount Q detected by the air flow rate sensor 4 consisting of a detector such as a hot wire type air flow meter, is converted into a digital value by the A/D converter 21 and is taken-in by the CPU 25. A REF signal detected by a crank reference position sensor 2 and a POS signal detected by the crank angle sensor 3 are taken-in by the CPU via the input unit 20 of the I/O unit, and these values are used therein to obtain an engine rotation number.

The CPU 25 performs a processing according to a program stored in the ROM 24, determines the fuel injection signal Ti and the ignition timing signal $\theta$ eigne and transmits the determined signals to respective actuators (not shown) via the output unit 23 of the I/O unit.

On the other hand, the output signal from the vibration sensor 1, which is referred to as a knock sensor, is taken-in via the amplifier 26 and the band pass filter 27 and applied to the A/D converter 28, which digitizes the signal in response to the REF signal generation timing and samples data necessary for knocking judgement. When the A/D converter 28 takes-in necessary data for knocking judgement, the A/D converter generates an interruption signal to the CPU 25.

In response to the interruption signal from the A/D converter 28, the CPU begins to process the sampled vibration sensor output signal in accordance with a knocking judgement program stored in the ROM 24, judges the presence and absence of knocking generation and reflects the judgement result on the ignition timing signal $\theta$ eigne to control knocking.

Figure 4:
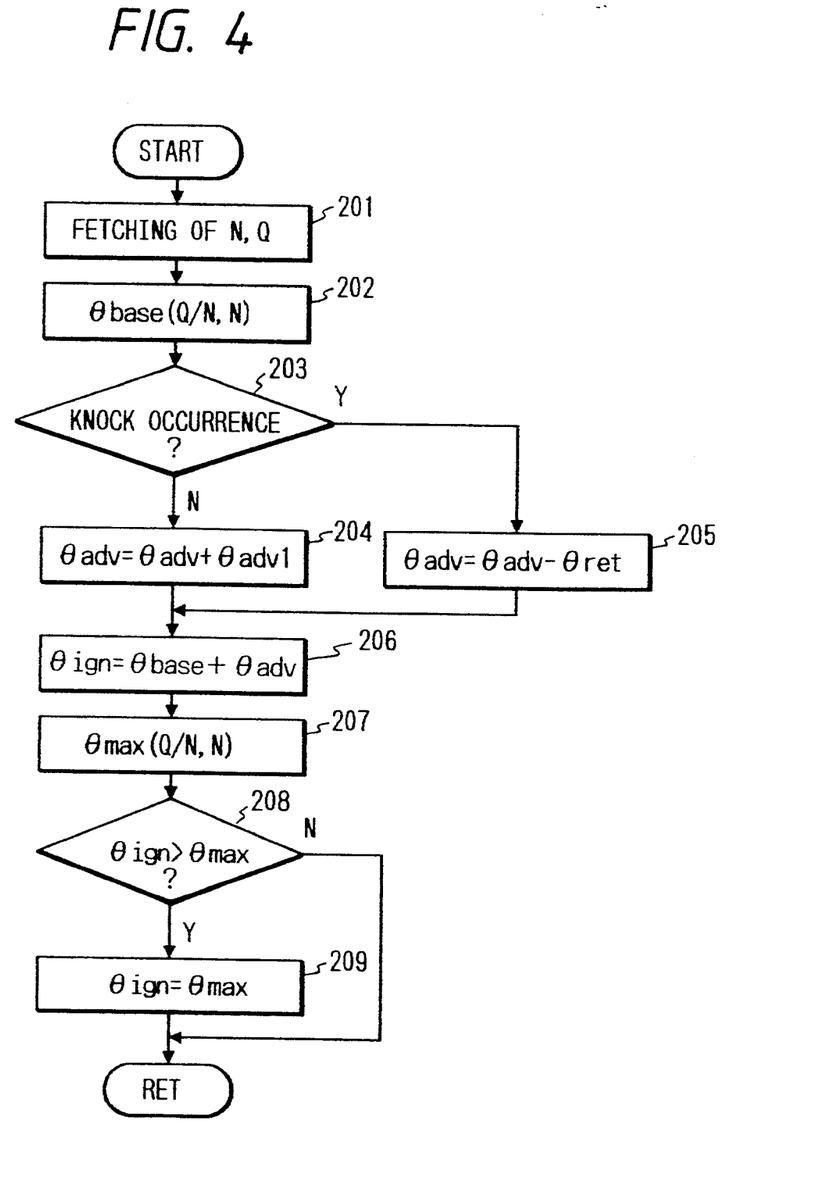
FIG. 4 is a flowchart for explaining the knocking control processing in the one embodiment according to the present invention.

At first, the ignition timing processing operation in the CPU 25 is explained with reference to the flowchart shown in FIG. 4. The processing operation in the flowchart shown in FIG. 4. The processing operation in the flowchart shown in FIG. 4 is initiated at a predetermined cycle, for instance, at every 20 msec.

In step 201, the engine rotation number N and an intake air amount Q are fetched from predetermined registers in the RAM 22. In step 202, an intake air amount per unit engine rotation number Q/N is calculated, and based upon the calculation result a base injection pulse width Tp and a base ignition timing $\theta$ base are respectively obtained with reference to a base fuel amount map and a base ignition timing map stored in the ROM 24. In step 203, the presence and absence of knocking generation is judged with reference to the content of a knock flag which will be explained later.

Now, when the presence of knocking generation is judged in step 203, a predetermined retard angle $\theta$ ret is subtracted from the previous advance angle $\theta$ adv to determine a new advance angle $\theta$ adv in step 205. By this substraction the ignition timing is retarded in comparison with the previous ignition timing to control or suppress the knocking.

On the other hand, when the absence of knocking generation is judged in step 203, a predetermined advance angle $\theta$ adv 1 is added to the previous advance angle $\theta$ adv to determine a new advance angle $\theta$ adv in step 204. By this addition the ignition timing is recovered step by step after the retardation for knocking control.

In step 206, a new advance angle $\theta$ adv thus obtained is added to the base ignition timing $\theta$ base to determine an ignition timing $\theta$ eigne. In step 207, a maximum advance angle $\theta$ max is determined based upon the engine rotation number N and the intake air amount per unit rotation number Q/N, which is carried out with reference to a maximum advance angle map stored in the ROM 24.

In step 208, it is judged whether or not the ignition timing $\theta$ eigne exceeds the maximum advance angle $\theta$ max. When the ignition timing $\theta$ eigne is determined to exceed the maximum advance angle $\theta$ max, the process proceeds to step 209 wherein the maximum advance angle $\theta$ max is determined as the ignition timing $\theta$ eigne and the processing in connection with the ignition timing control is completed. When the ignition $\theta$ eigne is determined not to exceed the maximum advance angle $\theta$ max, the calculated ignition timing $\theta$ eigne as it is is determined as the ignition timing and the processing in connection with the ignition timing control is completed.

Figure 5:
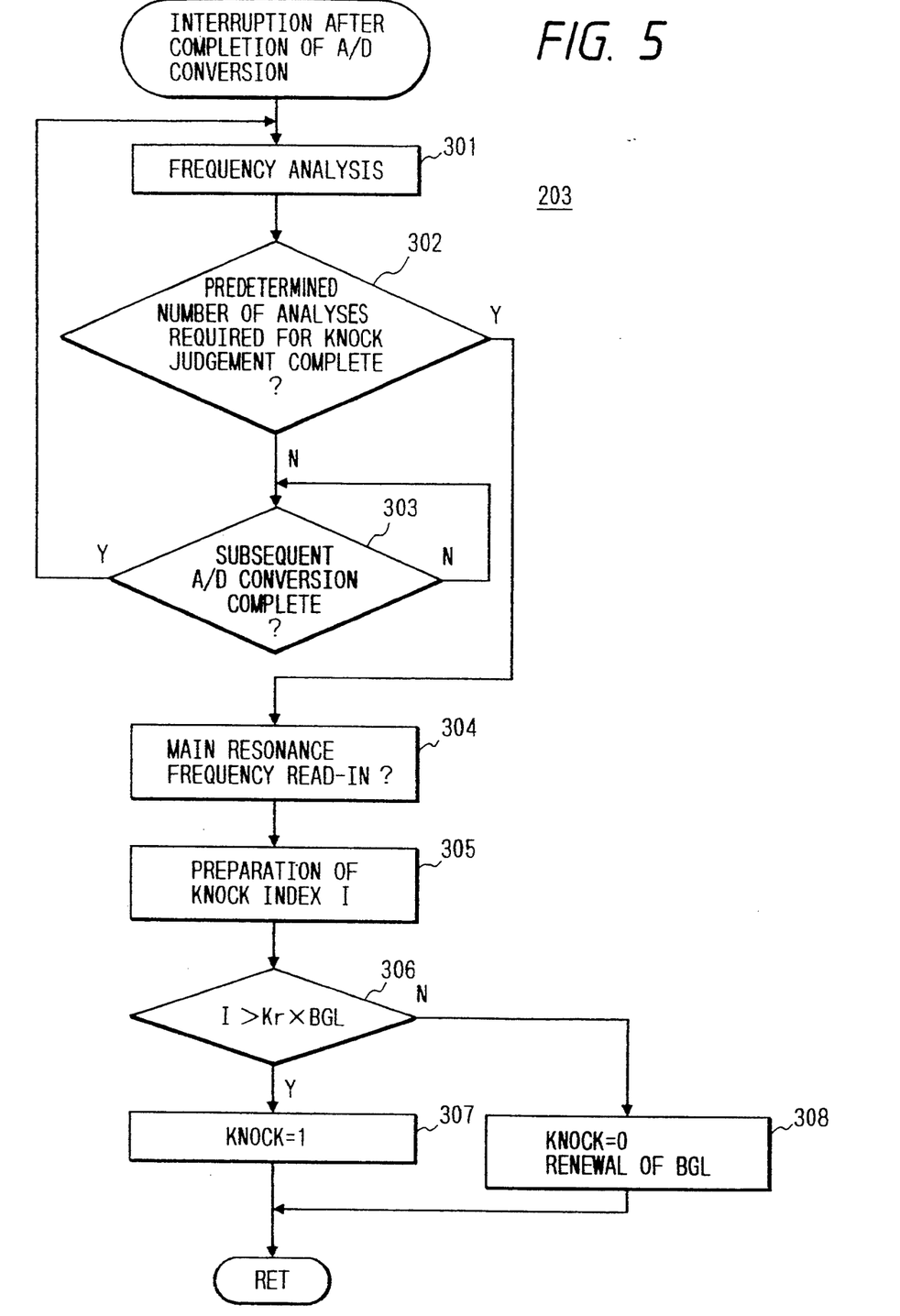
FIG. 5 is a flowchart for explaining the knocking judgement processing in step 203 in the flowchart shown in FIG. 4.

The processing operation in step 203 with regard to the judgement of the presence and absence of knocking generation by the CPU 25 is explained with reference to the flowchart shown in FIG. 5. The processing according to the flowchart shown in FIG. 5 is initiated after the A/D converter 28, which is initiated by an interruption signal REF signal, completes the taking in of data necessary for a frequency analysis to be carried out in the CPU 25.

In step 301, the output signal from the vibration sensor 1 is frequency-analyzed based upon the data output of A/D converter. In the frequency analysis after the first analysis, the analysis may be performed by overlapping the part of the data used in a previous frequency analysis with the present data or by interposing a gap between the data used in the previous frequency analysis and the present data.

In step 302, it is determined whether or not a predetermined number of analysis determined for knocking judgement during one explosion stroke have been completed. When the predetermined number of analysis have not been completed, the process goes to step 303 and waits for the completion of the subsequent A/D conversion. When the required number of analyses have been completed, a main resonance frequency, such as 6.3 KHz, 10.4 KHz, 13.0 KHz, 14.3 KHz and 18.1 KHz is read-in in step 304. The main resonance frequency read-in in step 304 varies depending upon the engine rotation number and engine load.

Figure 6:
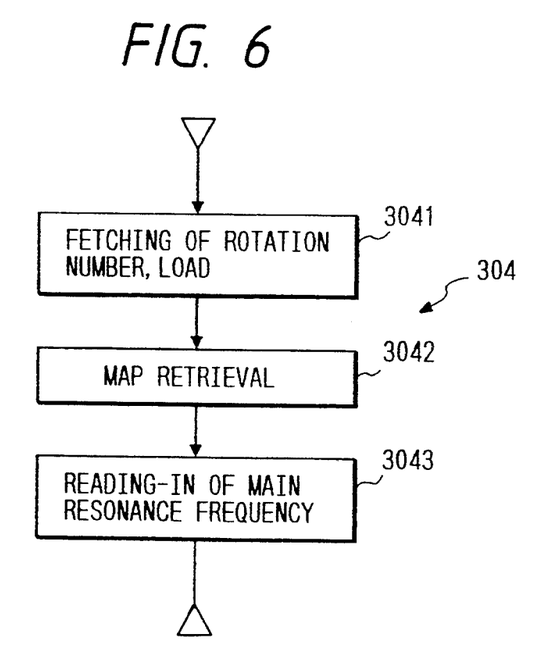
FIG. 6 is a flowchart for explaining the knocking judgement processing in step 304 in the flowchart shown in FIG. 5.
Figure 7:
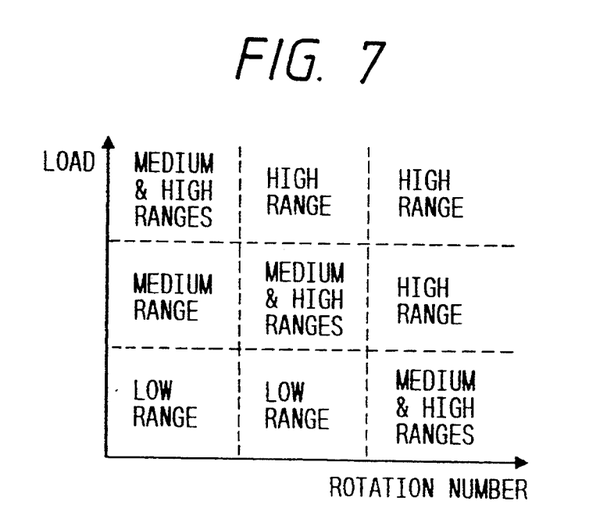
FIG. 7 is a table showing resonance frequency components characteristic to knocking vibration used in step 3042 in the flowchart shown in FIG. 6.

With reference to FIG. 6, the processing in step 304 is explained in detail. At first in step 3041, the engine rotation number and engine load are fetched. In step 3042, the map illustrated in FIG. 7 is retrieved based upon the current engine rotation number and engine load to determine a main resonance frequency used for the present knocking judgement; and in step 3043, the determined main resonance frequency is read-in for use in the following steps.

Now returning to the flowchart shown in FIG. 5, in step 305, a knocking index I is determined in accordance with the equation (1) by making use of the main resonance frequency obtained in step 304 for the respective frequency analyzed data.

$$I + A_1X_1 + A_2X_2 + \cdots + A_iX_i + A_nX_n \quad (1)$$

wherein $X_i$: power spectrum of the resonance frequency component, $A_i = 1$ for a resonance frequency component selected in step 304, and $A_i = 0$ for other resonance frequency components.

In step 306, the product of a background level BGL and a slice level Kr representing a threshold level for knocking generation judgement is compared with the largest knocking index I determined in step 305, and when the knocking index I is larger than the product, a knocking generation is judged in step 307 and the flag is set at knock=0 thereby completely the judgement processing.

On the other hand, when the knocking index I is judged to be smaller than the product in step 306, no knocking generation is judged in step 308, the flag is set at knock=1, the background level BGL is renewed according to the following equation (2) and the knocking judgement processing is completed.

$$\text{present BGL} = (1 - 1/N) \times \text{previous BGL} + (1/N) \times \text{knocking I} \quad (2)$$

wherein N: sampling number.

As will be understood from the above explanation, according to the present invention as illustrated in FIG. 1, among a plurality of data in one explosion stroke existing in a sequential manner, one data containing the specific resonance frequency component having the largest intensity which has been determined based upon the instant engine operating condition is selected for knocking generation judgement, therefore an accurate knocking generation judgement is enabled under a high sensitivity such that a knocking control on the engine is easily and reliably performed.

A further embodiment of the present invention is explained with reference to FIGS. 8 (a) through 8 (e). The knocking judgement in accordance with the present embodiment at first searches for a data portion exhibiting the highest output among output data from the vibration sensor and thereafter the output in a limited crank angle range is frequency-analyzed for knocking generation judgement in such a manner that the data portion exhibiting the highest output is located at the center of a limited analysis range.

The vibration sensor normally generates an output signal as illustrated in FIG. 8 (a) during the fuel combustion in an internal combustion engine. In the present embodiment, the vibration signal during the combustion stroke is divided into a plurality of intervals in a time sequential direction as illustrated in FIG. 8 (b) and thereafter vibration intensities at respective intervals are analized as illustrated in FIG. 8 (c). When there are intervals in the vibration intensity P determined by the previous analysis exceeds a product KBGL of background level and a slice level sr, an interval which includes the highest vibration intensity is determined as a portion which possibly exhibits the highest knocking intensity during the explosion stroke and the crank angle range of the interval is stored and. Thereafter an analysis range or knocking judgement section is determined to fully cover the stored crank angle range as shown in FIG. 8 (d) in such a manner that the stored crank angle in which the vibration exhibiting the highest intensity appears located at the center of the analysis range, and subsequently the vibration signal in the limited range is frequency-analyzed for judging knocking generation. As a result, a knocking detection with a high S/N ratio and a high sensitivity is achieved as shown in FIG. 8 (e).

Figure 9:
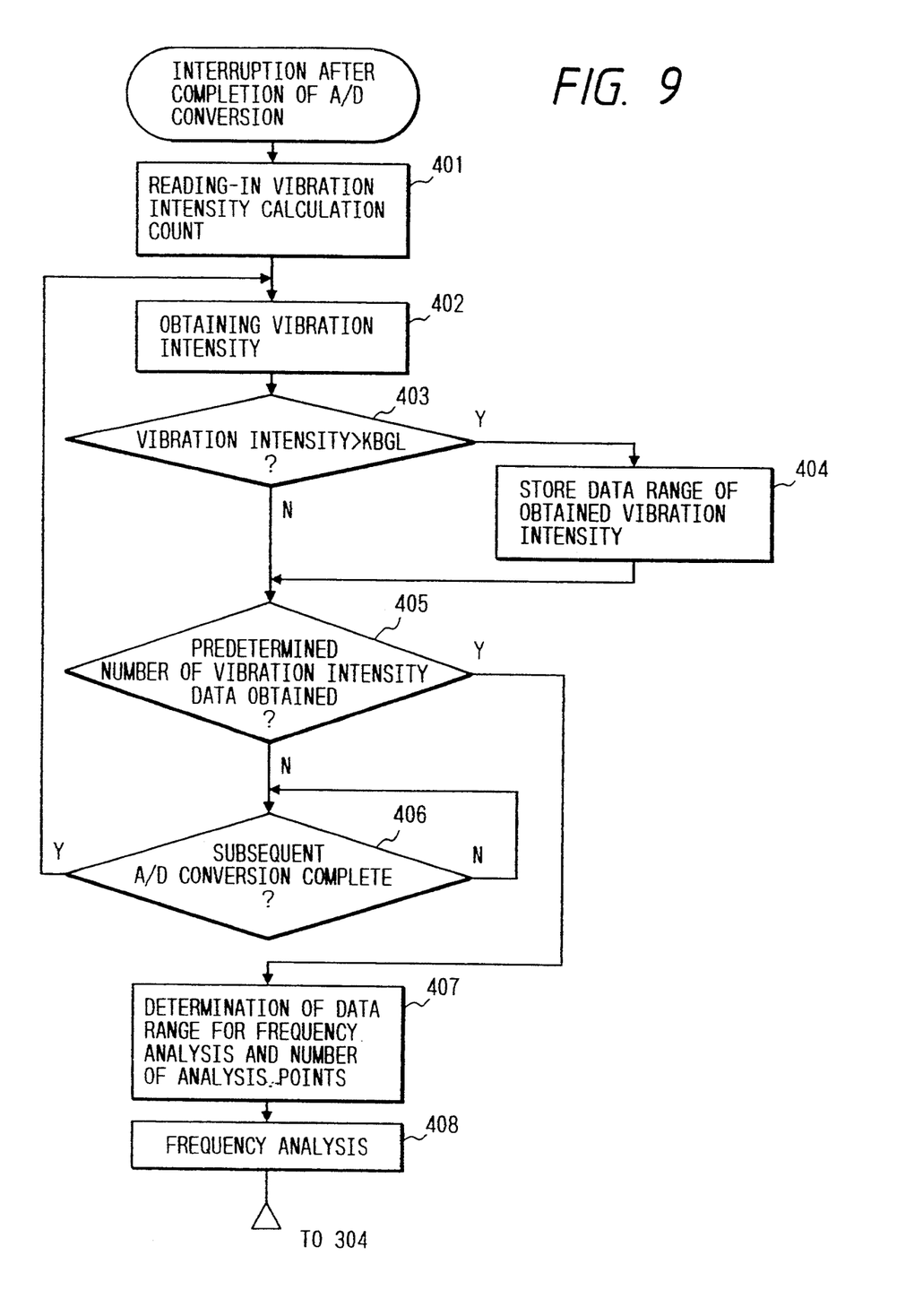
FIG. 9 is a flowchart for explaining the knocking control processing in the other embodiment according to the present invention.

The knocking detection according to the further embodiment is explained with reference to the flowchart shown in FIG. 9.

When an interruption signal indicating the completion of the A/D conversion is generated, at first in step 401 the number of the vibration intensity calculation is counted. In step 402, the output vibration components in a predetermined narrow crank angle range are analyzed to determine the vibration intensity P thereof. In step 403, the determined vibration intensity P is compared with the product KBGL representing a threshold value of vibration intensity and when the determined vibration intensity exceeds the threshold vibration intensity KBGL the process proceeds to step 404 wherein the data range or the crank angle range in which the vibration intensity analysis is performed is stored.

Figure 8A:
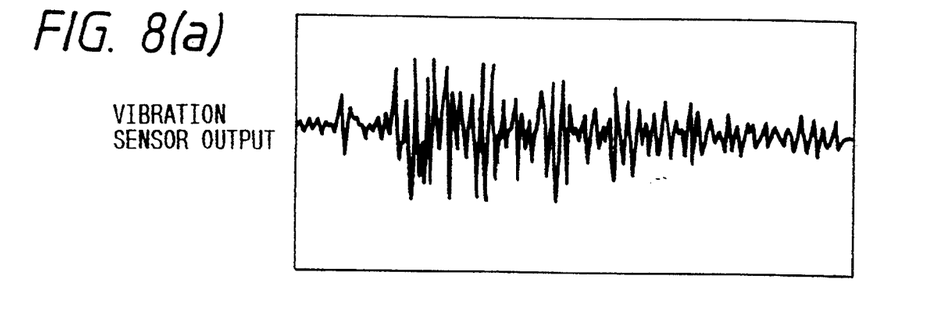
FIGS. 8(a) through 8(e) are views for explaining the operating principle of another embodiment of a knocking detecting device for an internal combustion engine according to the present invention.
Figure 8B:
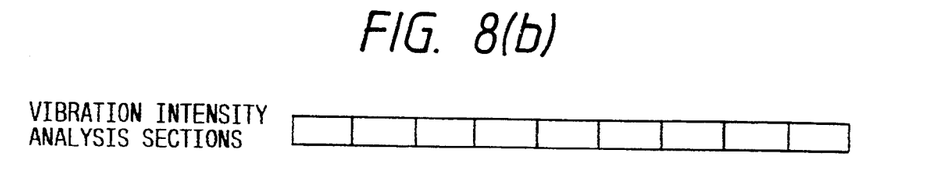
Figure 8C:
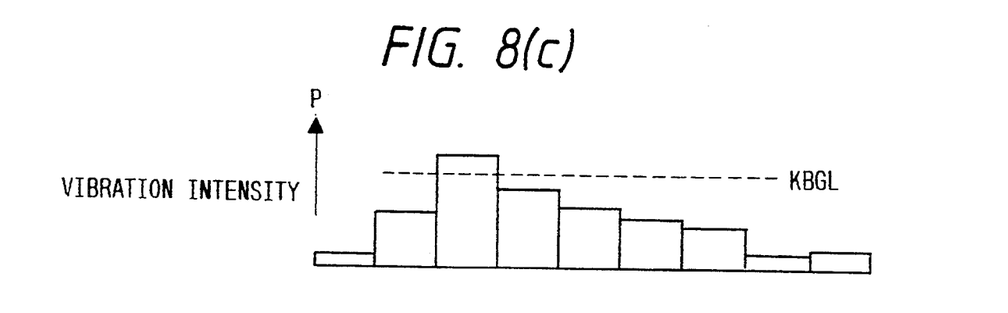
Figure 8D:
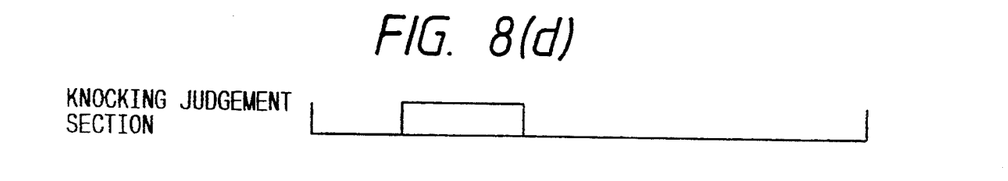
Figure 8E:
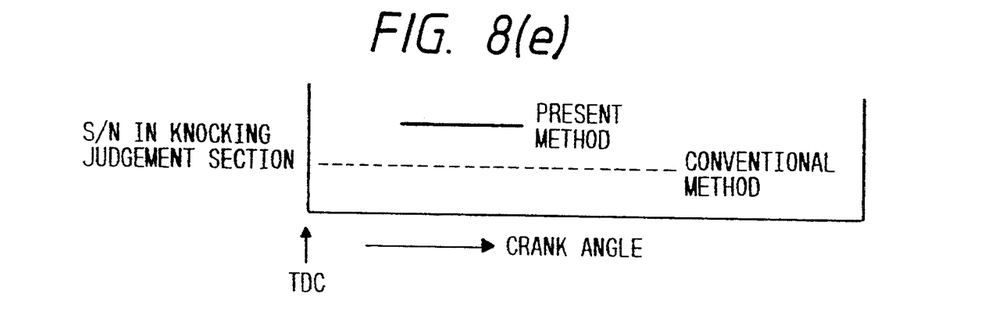

In step 405, it is judged whether or not the predetermined number of vibration intensity analyses have been completed, and when the predetermined number of analyses has not yet been completed, the process proceeds to step 406 and waits there for the completion of an A/D conversion. When the predetermined number of analyses have been completed the process proceeds to step 407 wherein the frequency analysis range is determined based upon the stored data range in step 404 as explained with reference to FIG. 8 (d) and thereafter the process goes to step 408 wherein the vibration signal in the limited determined crank angle range is frequency-analyzed for subsequent knocking generation judgement.

Therefore, according to the present embodiment, as explained in connection with FIG. 8 a knocking detection with a high S/N ratio and a high sensitivity is enabled which results in a knocking control for an internal combustion engine which is easily and reliably achieved.

I claim:

1. A knocking detecting device for an internal combustion engine, comprising:

a vibration sensor for detecting vibrations, including engine vibrations and engine cylinder internal pressure vibrations, and for producing output vibrations signals;

means for taking-in said output vibration signals from said vibration sensor in a plurality of sequential intervals during one explosion stroke of the internal combustion engine;

means for independently processing the taken-in output vibration signals in each of the respective sequential intervals using a digital frequency analysis;

means for setting a main resonance frequency component necessary for knocking occurrence judgement based upon an instant operating condition of the internal combustion engine;

means for calculating respective knocking indexes for the digital frequency-analyzed output vibration signals in the respective sequential intervals based upon the set main resonance frequency component;

means for comparing the largest calculated knocking index with a predetermined threshold value determined by a background vibration level and a slice level thereof to determine an occurrence of knocking; and means for generating an output signal when knocking is determined by said comparing means.

2. The knocking detecting device for an internal combustion engine according to claim 1, further comprising means for renewing the background vibration level using the calculated knocking indexes when no knocking occurrence is determined.

3. A knocking detecting device for an internal combustion engine, comprising:
- a vibration sensor for detecting vibrations, including engine vibrations and engine cylinder internal pressure vibrations and for producing output vibration signals;
- means for taking in said output vibration signals from said vibration sensor in a plurality of sequential intervals during one explosion stroke of the internal combustion engine;
- means for selecting one of said sequential intervals in which said output vibration signals exhibit the highest intensity above a first predetermined threshold value;
- means for determining a frequency analysis interval in such a manner that the selected sequential interval is located at the center of the frequency analysis interval;
- means for performing a frequency analysis on the output vibration signals in the determined frequency analysis interval;
- means for setting a main resonance frequency component necessary for knocking occurrence judgement based upon an instant operating condition of the internal combustion engine;
- means for calculating a knocking index for the frequency analyzed output vibration signals in the determined frequency analysis interval based upon the set main resonance frequency component;
- means for comparing the calculated knocking index with a second predetermined threshold value determined by a background vibration level and a slice level thereof to determine an occurrence of knocking; and
- means for generating an output signal when an occurrence of knocking is determined by said comparing means.

4. A method of detecting knocking generated in an internal combustion engine, comprising the steps of:
- taking-in output vibration signals from a vibration sensor which detects vibrations of the internal combustion engine in a plurality of sequential intervals during every explosion stroke of the internal combustion engine;
- frequency analyzing the taken-in output vibration signals independently in each of the respective sequential intervals;
- setting a main resonance frequency component necessary for knocking occurrence judgement based upon the instant operating condition of the internal combustion engine;
- calculating respective knocking indexes for the frequency analyzed output vibration signals in each of the respective sequential intervals based upon the set main resonance frequency component;
- comparing the largest calculated knocking index with a predetermined threshold value determined by a background vibration level and a slice level thereof to determine occurrence of knocking;
- generating an output signal when knocking is determined in said comparing step; and
- renewing the respective background vibration levels using the calculated knocking indexes which result when no knocking occurrence is determined.

5. A method of detecting knocking generated in an internal combustion engine, comprising the steps of:
- taking-in output vibration signals from a vibration sensor which detects vibrations of the internal combustion engine which occur in a plurality of sequential intervals during each explosion stroke of the internal combustion engine;
- selecting that one of said sequential intervals in which the output vibration signals exhibit the highest intensity above a first predetermined threshold value;
- determining a frequency analysis interval in such a manner that the selected sequential interval is located at the center of the frequency analysis interval;
- performing frequency analysis on the output vibration signals in the determined frequency analysis interval;
- setting a main resonance frequency component necessary for knocking occurrence judgement based upon the instant operating condition of the internal combustion engine;
- calculating a knocking index for the frequency analyzed output vibration signals in the determined frequency analysis interval based upon the set main resonance frequency component;
- comparing the calculated knocking index with a second predetermined threshold value determined by a background vibration level and a slice level thereof to determine occurrence of knocking; and
- generating an output signal when knocking is determined in said comparing step.

* * * * *